(12) United States Patent
Murakami (10) Patent No.: US 9,010,199 B2
(45) Date of Patent: Apr. 21, 2015

(54) STATOR OF TORQUE SENSOR

(71) Applicant: JTEKT Corporation, Osaka-shi, Osaka (JP)

(72) Inventor: Toshiaki Murakami, Nagoya (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/790,978

(22) Filed: Mar. 8, 2013

(65) Prior Publication Data

US 2013/0239703 A1 Sep. 19, 2013

(30) Foreign Application Priority Data

Mar. 16, 2012 (JP) ................... 2012-060296
Jul. 5, 2012 (JP) ................... 2012-151555

(51) Int. Cl.
*G01L 3/00* (2006.01)
*G01L 3/10* (2006.01)
*H02K 24/00* (2006.01)

(52) U.S. Cl.
CPC .............. *G01L 3/105* (2013.01); *H02K 24/00* (2013.01)

(58) Field of Classification Search
CPC .......... H02K 24/00; G01L 3/105; G01L 3/10; G01L 3/101; G01L 3/109; G01L 3/1435; G01L 3/04; G01L 3/30
USPC ................................... 73/826.328
See application file for complete search history.

(56) References Cited

U.S. PATENT DOCUMENTS

| 3,079,791 | A * | 3/1963 | Oswald ................... 73/862.328 |
| 4,275,588 | A * | 6/1981 | Rundell ................... 73/862.328 |
| 4,444,063 | A * | 4/1984 | Snowden et al. ......... 73/862.328 |
| 7,134,329 | B2 * | 11/2006 | Ha ............................ 73/862.328 |
| 7,363,826 | B2 * | 4/2008 | Sano ......................... 73/862.328 |
| 8,215,188 | B2 * | 7/2012 | Klimenko et al. ....... 73/862.328 |
| 2002/0063491 | A1* | 5/2002 | Kobayashi et al. ........... 310/254 |
| 2003/0030349 | A1* | 2/2003 | Kobayashi et al. ........... 310/254 |
| 2008/0017438 | A1* | 1/2008 | Kanda et al. ................. 310/68 B |
| 2008/0277189 | A1* | 11/2008 | Kanda et al. ................... 180/443 |
| 2009/0212654 | A1* | 8/2009 | Kaneiwa ....................... 310/214 |
| 2011/0215666 | A1* | 9/2011 | Sakuma et al. ................. 310/91 |
| 2012/0242198 | A1* | 9/2012 | Kasuya et al. .............. 310/68 B |

FOREIGN PATENT DOCUMENTS

| CN | 202309423 U | * | 7/2012 |
| EP | 1 211 782 A1 | | 6/2002 |
| JP | 60220834 A | * | 11/1985 |
| JP | A-2005-315645 | | 11/2005 |
| JP | A-2008-58026 | | 3/2008 |

OTHER PUBLICATIONS

Jul. 1, 2013 extended European Search Report issued in European Patent Application No. EP 13 15 8765.

* cited by examiner

*Primary Examiner* — Lisa Caputo
*Assistant Examiner* — Philip Cotey
(74) *Attorney, Agent, or Firm* — Oliff PLC (57) ABSTRACT

A stator includes: cylindrical stator cores, each of which is formed of a laminated structure of electromagnetic steel sheets and at which an exciting coil and a detection coil are wound; and a mounting seat portion that is fixedly fitted to axial end faces of the stator cores. Insertion holes through which inserting bolts are passed are formed in the mounting seat portion.

11 Claims, 11 Drawing Sheets

STATOR OF TORQUE SENSOR

INCORPORATION BY REFERENCE/RELATED APPLICATION

This application claims priority to Japanese Patent Application No. 2012-060296 filed on Mar. 16, 2012 and No. 2012-151555 filed on Jul. 5, 2012 the disclosure of which, including the specification, drawings and abstract, is incorporated herein by reference in its entirety.

BACKGROUND OF THE INVENTION

1. Field of the Invention

The invention relates to a stator of a torque sensor, which is formed of a laminated structure of electromagnetic steel sheets.

2. Discussion of Background

A twin resolver-type torque sensor as described in Japanese Patent Application Publication No. 2008-58026 (JP 2008-58026 A) has been conventionally used as one type of torque sensor. The torque sensor includes a first resolver that detects a rotation angle of a first rotary shaft and a second resolver that detects a rotation angle of a second rotary shaft. The first rotary shaft and the second rotary shaft are coupled to each other via a torsion bar. The torque sensor described in JP 2008-58026 A calculates the rotation angle of the first rotary shaft and the rotation angle of the second rotary shaft on the basis of corresponding signals output from the two respective resolvers, and obtains the amount of torsion of the torsion bar by computing the difference between the calculated rotation angles. A torque that acts on the rotary shaft is calculated on the basis of the amount of torsion.

A stator of each resolver is fixed to, for example, a case that accommodates the resolvers. As such a fixation structure, there is a structure described in Japanese Patent Application Publication No. 2005-315645 (JP 2005-315645 A). In each of the resolvers described in JP 2008-58026 A, a flange that has insertion holes is formed on the outer periphery of each stator core. In addition, the distal end portion of each bolt protrudes from the inner wall face of the case. En the resolver described in JP 2005-315645 A, after the distal end portion of each bolt that protrudes from the inner wall face of the case is passed through a corresponding one of insertion holes of a stator core, a nut is screwed to the distal end portion of each bolt. Then, the stator core is fixed to the case by fastening the nuts.

In the case of such a fixation structure, when each nut is fastened, stress is generated in the stator core due to fastening axial force. Such stress exerts influences on the magnetic characteristic of the stator core, thereby leading to, for example, an increase in a core loss of the stator core and a decrease in magnetic flux density. This causes a decrease in the ratio of the output voltage of a detection coil to the input voltage of an exciting coil (voltage transformation ratio), and a decrease in the accuracy of detection of a rotation angle.

SUMMARY OF THE INVENTION

The invention provides a stator of a torque sensor in which deterioration of the magnetic characteristic of a stator core due to fastening of a fastening member is suppressed.

According to a feature of an example of the invention, two cylindrical stator cores, each of which is formed of a laminated structure of electromagnetic steel sheets and at which a coil is wound, are arranged so as to be aligned in an axial direction, a mounting seat portion is fixedly fitted to axial end portions of the respective stator cores, and an insertion hole through which a fastening member is passed is formed in the mounting seat portion.

According to another feature of an example of the invention, the mounting seat portion is formed separately from the two stator cores, and is held by the two stator cores such that the mounting seat portion and the two stator cores are fixedly fitted to each other.

According to a further feature of an example of the invention, an intervening member is interposed between a base member and the mounting seat portion when the mounting seat portion is fastened to the base member by the fastening member.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5A is a plan view that shows the planar structure of a second modified example of the torque sensor according to the second embodiment;

DETAILED DESCRIPTION OF EMBODIMENTS

Hereinafter, embodiments of the invention will be described with reference to the accompanying drawings.

Figure 1A:
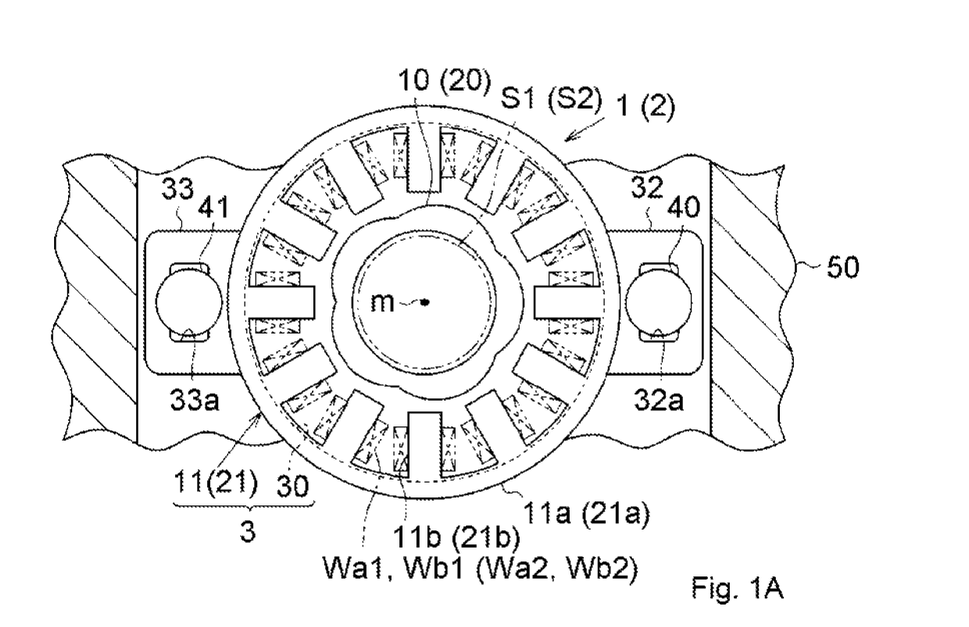
FIG. 1A is a plan view that shows the planar structure of a torque sensor according to a first embodiment, in which a stator according to the invention is used.
Figure 1B:
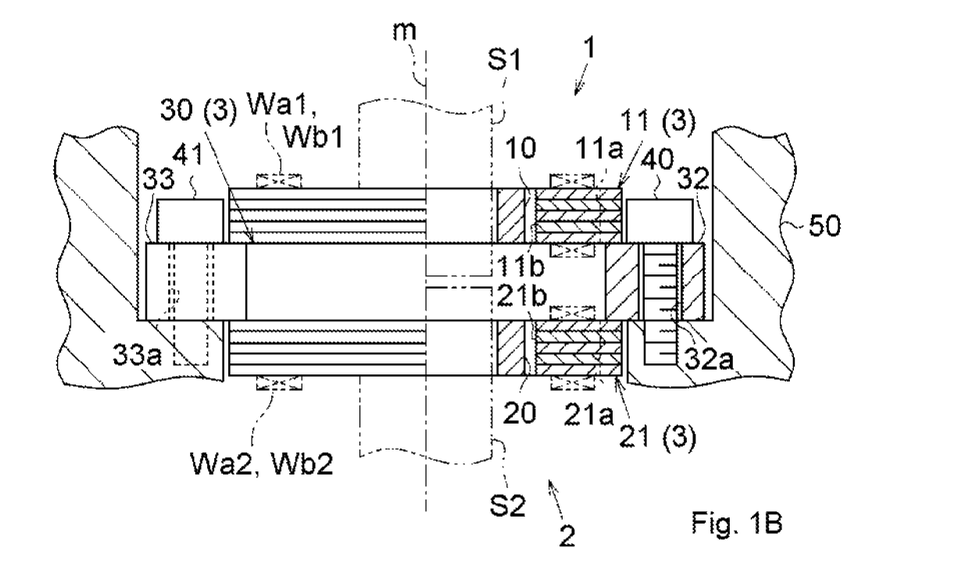
FIG. 1B is a sectional view that shows the half-sectional structure of the torque sensor according to the first embodiment.

As shown in FIG. 1A and FIG. 1B, a torque sensor according to a first embodiment of the invention is a so-called twin-resolver type resolver, and includes a first resolver 1 and a second resolver 2 that are fixedly fitted to each other. The first resolver 1 detects a rotation angle of a first rotary shaft S1. The second resolver 2 detects a rotation angle of a second rotary shaft S2. The first rotary shaft S1 and the second rotary shaft S2 are coupled to each other via a torsion bar (not shown) on the same axis m. The torque sensor detects the amount of torsion of the torsion bar by obtaining a difference between the rotation angle detected by the first resolver 1 and the rotation angle detected by the second resolver 2. The torque sensor detects a torque that is applied to the first rotary shaft S1 and the second rotary shaft S2 on the basis of the amount of torsion.

The first resolver 1 is a so-called variable reluctance (VR)-type resolver. The first resolver 1 includes a rotor 10 and a stator core 11. The rotor 10 is fixed to the first rotary shaft S1. The stator core 11 is arranged so as to surround the rotor 10. The multiplication factor of angle of the first resolver 1 is set to "5×". Note that the multiplication factor of angle indicates the multiplication ratio of electric angle that is output from the resolver, that is, the multiplication factor of angle indicates the multiplication ratio of electric angle of the rotor 10 to the mechanical angle of the rotor 10.

As shown in FIG. 1A, five bulging portions corresponding to the multiplication factor of angle are formed on the outer periphery of the rotor 10. The rotor 10 is formed by laminating a plurality of electromagnetic steel sheets in a direction along the axis m.

The stator core 11 has a cylindrical outer annular portion 11a and a plurality of teeth 11b. The teeth 11b protrude from the inner periphery of the outer annular portion 11a toward the rotor 10. As indicated by the long dashed double-short dashed line in the drawing, an exciting coil Wa1 or a detection coil Wb1 is wound around each of the teeth 11b. The stator core 11 is also formed by laminating a plurality of electromagnetic steel sheets in a direction along the axis m.

In the first resolver 1, when an alternating-current voltage is applied to the exciting coil Wa1, an alternating field is generated in the exciting coil Wa1. The alternating field is applied to the detection coil Wb1 through a magnetic path formed between the rotor 10 and the teeth 11b, and a voltage is induced in the detection coil Wb1 due to electromagnetic induction action. In addition, when the rotor 10 rotates in accordance with the rotation of the first rotary shaft S1, the positions of the bulging portions of the rotor 10 change. As a result, a clearance between the rotor 10 and each of the teeth 11b periodically changes. Thus, a voltage signal that is output from the detection coil 11b periodically changes on the basis of the rotation angle (electric angle) of the rotor 10. The first resolver 1 detects the rotation angle of the first rotary shaft S1 on the basis of the voltage signal that is output from the detection coil Wb1.

The second resolver 2 basically has a structure similar to that of the first resolver 1 except that the multiplication factor of angle is set to "4×". That is, the second resolver 2 is also a VR-type resolver. The second resolver 2 includes a rotor 20 and a stator core 21. The rotor 20 is fixed to the second rotary shaft 52. The stator core 21 is arranged so as to surround the rotor 20. The stator core 21 includes a cylindrical outer annular portion 21a and a plurality of teeth 21b. The teeth 21b protrude from the inner periphery of the outer annular portion 21a toward the rotor 10. An exciting, coil Wa2 or a detection coil Wb2 is wound around each of the teeth 21b. Because the structures of these elements and the operation of the second resolver 2 are basically similar to those of the first resolver 1, the detailed description thereof is omitted.

As shown in FIG. 1B, a mounting seat portion 30 is fixedly fitted to the stator core 11 and the stator core 21 so as to be held between the stator core 11 and the stator core 21. In the present embodiment, the stator cores 11, 21 and the mounting seat portion 30 constitute a stator 3.

As shown in FIG. 1A, the mounting seat portion 30 is formed separately from the stator cores 11, 21, and is formed in a cylindrical shape having the same outside diameter as the outside diameters of the stator cores 11, 21. The mounting seat portion 30 is formed by laminating a plurality of electromagnetic steel sheets in the direction along the axis m. A recess (not shown) is formed in one of the contact face of the mounting seat portion 30 and the contact face of the stator core 11. In addition, a protrusion (not shown) is formed on the other one of them. By swaging the recess and protrusion to each other, the mounting seat portion 30 is laminated in the axial direction on the electromagnetic steel sheet arranged at the end of the stator core 11 and is fixedly fitted to the electromagnetic steel sheet. A similar swaging structure formed of a recess and a protrusion is also provided in contact faces of the mounting seat portion 30 and stator core 21. Due to the swaging structure, the mounting seat portion 30 is laminated in the axial direction on the electromagnetic steel sheet arranged at the end of the stator core 21 and is fixedly fitted to the electromagnetic steel sheet.

As shown in FIG. 1A, a pair of fixing portions 32, 33 that protrude outward is formed on the outer periphery of the mounting seat portion 30. The fixing portions 32, 33 are arranged at symmetrical positions with respect to the axis m. As shown in FIG. 1B, an insertion hole 32a through which a bolt 40 is passed is formed in the fixing portion 32, and an insertion hole 33a through which a bolt 41 is passed is formed in the fixing, portion 33. By respectively screwing the distal ends of the bolts 40, 41 to threaded holes of a case (base member) 50, the mounting seat portion 30 is fastened to the case 50. Thus, the entirety of the stator 3 is fixed to the case 50 via the mounting seat portion 30.

Next, the operation of the stator 3 according to the present embodiment will be described with reference to FIG. 1A, FIG. 1B and FIG. 2. As shown in FIG. 1A, the outer diameter of the mounting seat portion 30 is the same as the outer diameters of the stator cores 11, 21. Therefore, it is possible to easily fit the mounting seat portion 30 to the stator cores 11, 21. The insertion holes 32a, 33a are respectively formed in the fixing portions 32, 33 that protrude from the outer periphery of the mounting seat portion 30. Therefore, it is easy to pass the bolts 40, 41 through the insertion holes 32a, 33a. As a result, it becomes easy to conduct work for fastening the bolts 40, 41.

Figure 2:
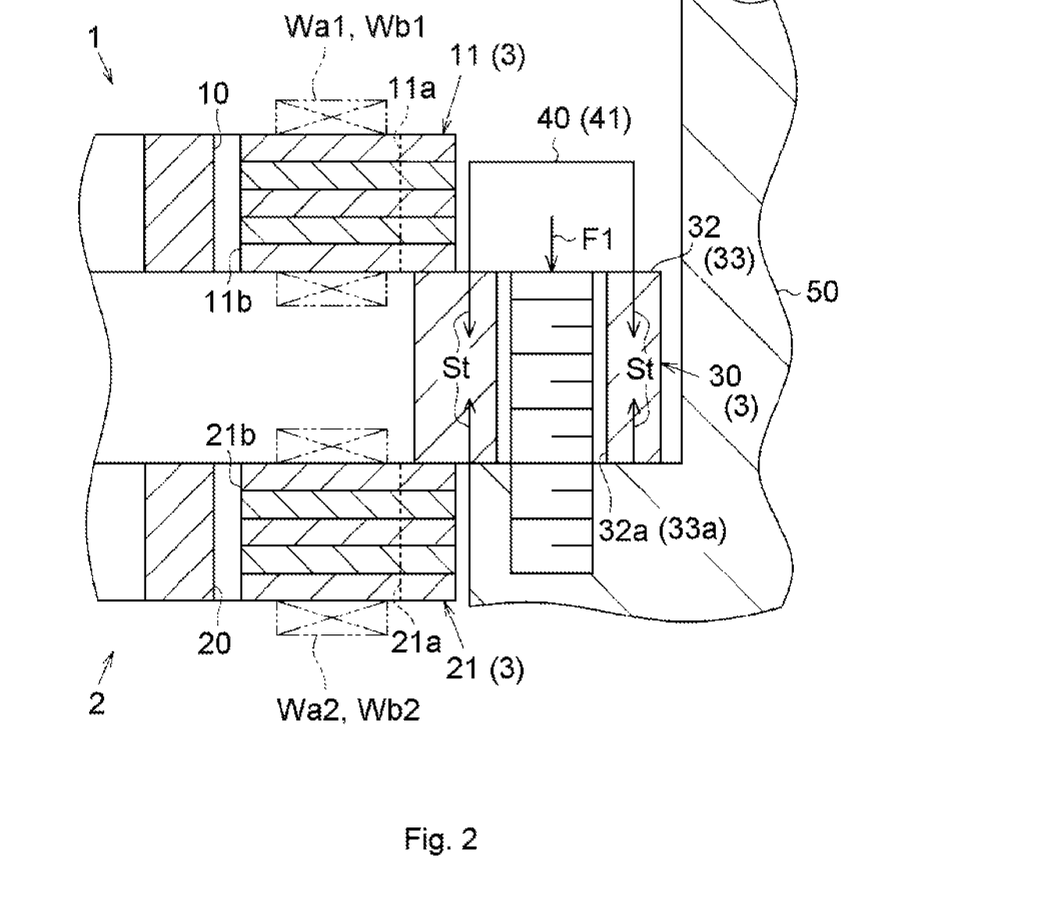
FIG. 2 is a sectional view that shows the enlarged sectional structure of a fixing; portion of a mounting seat portion and its surroundings in the torque sensor according; to the first embodiment.

As shown in FIG. 2, when the mounting seat portion 30 has been fastened to the case 50 with the bolts 40, 41, a fastening axial force F1 of each of the bolts 40, 41 acts mainly on the mounting seat portion 30. At this time, a stress that acts on the stator 3 due to fastening of the bolts 40, 41 is only a stress St that acts on the mounting seat portion 30 as indicated by arrows in the drawing, and almost no stress acts on the stator cores 11, 21. Therefore, it is possible to suppress deterioration of the magnetic characteristic of each of the stator cores 11, 21 due to fastening of the bolts 40, 41. This means that the magnetic characteristic of each of the stator cores 11, 21 is hard to change before and after the bolts 40, 41 are fastened. Thus, it is possible to suppress a decrease in the rotation angle detection accuracy of each of the resolvers 1, 2 and a decrease in the voltage transformation ratio of each of the resolvers 1, 2 and consequently, it is possible to ensure the stable detection accuracy of the torque sensor.

As described above, with the stator of the torque sensor according to the present embodiment, the following advantageous effects are obtained.

(1) The mounting seat portion 30 is fixedly fitted to the axial end portions of the respective stator cores 11, 21. The insertion holes 32a, 33a through which the bolts 40, 41 are passed are funned in the mounting seat portion 30. Thus, it is possible to suppress deterioration of the magnetic characteristic of each of the stator cores 11, 21 due to fastening of the bolts 40, 41. In addition, it is possible to suppress a change in the performance of the stator 3 before and after the fastening.

(2) The mounting seat portion 30 is formed of electromagnetic steel sheets. By laminating the mounting seat portion 30 in the axial direction on the electromagnetic steel sheets respectively arranged at the ends of the stator cores 11, 21, the mounting seat portion 30 is fixedly fitted to the stator cores 11, 21. Thus, when the stator cores 11, 21 are formed by laminating electromagnetic steel sheets, it is possible to fit the mounting seat portion 30 to the stator cores 11, 21 at the same time. Thus, it is possible to reduce the number of man-hours required for assembly.

(3) In the stator 3 that includes the two stator cores 11, 21, the mounting seat portion 30 is held by the stator cores 11, 21 so that the mounting seat portion 30 and the stator cores 11, 21 are fixedly fitted to each other. Thus, it becomes easy to fix the mounting seat portion 30 to the stator cores 11, 21.

(4) The fixing portions 32, 33 that protrude outward from the outer periphery of the mounting seat portion 30 are formed on the mounting seat portion 30. The insertion hole 32a through which the bolt 40 is passed is formed in the fixing, portion 32, and the insertion hole 33a through which the bolt 41 is passed is formed in the fixing portion 33. Thus, it becomes easy to fit the mounting seat portion 30 to the stator cores 11, 21. In addition, it becomes easy to conduct work for fastening the bolts 40, 41.

(5) The stator 3 to which the invention is applied is used for the first resolver 1 and the second resolver 2. Thus, the rotation angle detection accuracy of each of the first resolver 1 and the second resolver 2 and the voltage transformation ratio of each of the first resolver 1 and the second resolver 2 are improved. In addition, the torque detection accuracy of the torque sensor is improved.

Subsequently, a first modified example of the first embodiment will be described. In the first embodiment, as shown in FIG. 1B, the fixing portions 32, 33 of the mounting seat portion 30 are arranged at positions that are offset from the positions of the stator cores 11, 21 in the axial direction of each of the stator cores 11, 21 and that are offset from the outer periphery of each stator core. Alternatively, the fixing, portions may be arranged at positions that are the same as one of the positions of the stator cores in the axial direction of each stator core and that are set radially outward of one of the stator cores. More specifically, a structure shown in FIG. 3 may be employed.

Figure 3:
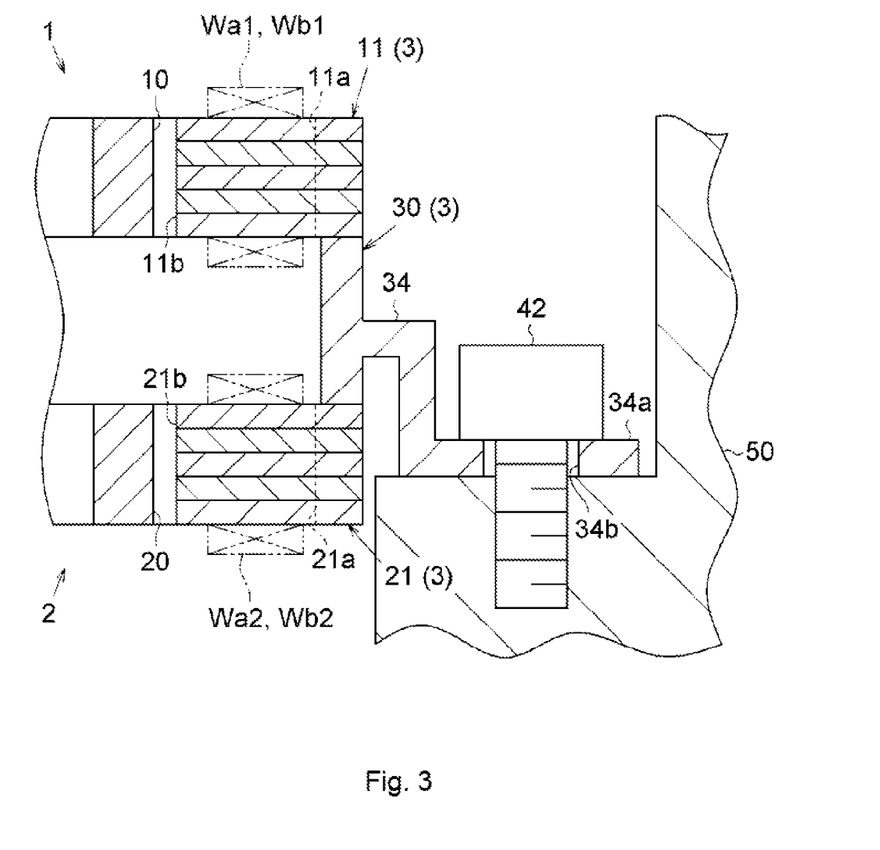
FIG. 3 is a sectional view that shows the enlarged sectional structure of a fixing portion of a mounting seat portion and its surroundings in a first modified example of the torque sensor according to the first embodiment.

In a modified example shown in FIG. 3, a fixing, portion 34 is formed by bending a portion, which protrudes outward from the outer periphery of the mounting seat portion 30, into a crank shape. An insertion hole 34b through which a bolt 42 is passed is formed in a flat portion 34a that is located at the outermost side of the fixing portion 34. By screwing the distal end portion of the bolt 42 into the threaded hole of the case 50, the mounting seat portion 30 is fastened to the case 50. With this structure, even when the fixing portion 34 is arranged on the radially outer side of the stator core 21, almost no stress due to fastening of the bolt 42 acts on the stator cores 11, 21. Therefore, it is possible to suppress deterioration of the magnetic characteristic of each of the stator cores 11, 21.

Subsequently, a second modified example of the first embodiment will be described. In a conventional stator core, the fastening positions of the bolts are located at symmetrical positions. This is because, when a stress acts on the stator cores due to fastening of the bolts, a stress distribution becomes a symmetrical distribution and it is possible to suppress variations in the magnetic characteristic of each stator core. In terms of this point, in a structure in which the mounting seat portion is fastened with the bolts as in the first embodiment, almost no stress occurs in each stator core, and it is possible to change the fastening position of each bolt as needed. Thus, for example, a structure shown in FIG. 4A and FIG. 4B may be employed. FIG. 4B shows the sectional structure taken along the line A-A in FIG. 4A.

Figure 4A:
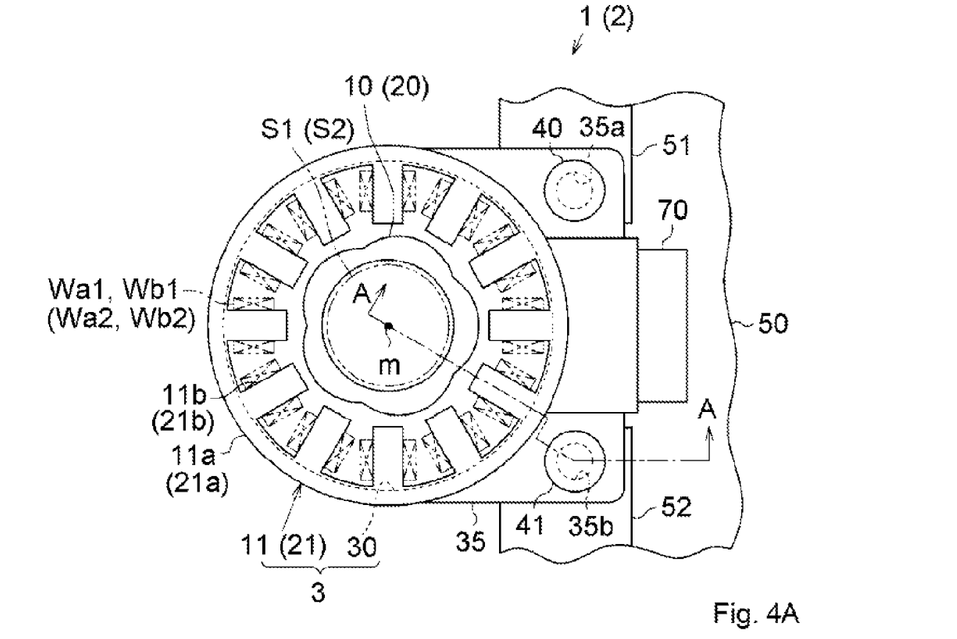
FIG. 4A is a plan view that shows the planar structure of a second modified example of the torque sensor according to the first embodiment.
Figure 4B:
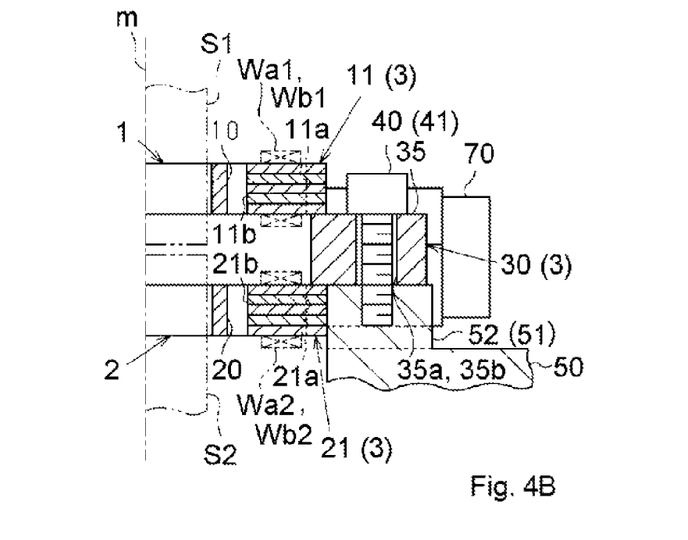
FIG. 4B is a sectional view that shows the sectional structure taken along the line in FIG. 4A.

In a modified example shown in FIG. 4A and FIG. 4B, a rectangular fixing portion 35 is formed on the outer periphery of the mounting seat portion 30. The fixing portion 35 has a width substantially the same as the diameter of each of the stator cores 11, 21. Insertion holes 35a, 35b through which the bolts 40, 41 are passed are formed in the corner portions of the outer peripheral portion of the fixing portion 35. As shown in FIG. 4B, by screwing, the distal end portions of the bolts 40, 41 into threaded holes respectively formed in bases 51, 52 of the case 50, the mounting seat portion 30 is fastened to the case 50. Even if the fastening, positions of the bolts are biased in this way, a biased stress does not act on each of the stator cores 11, 21. Thus, variations in the magnetic characteristic of each of the stator cores 11, 21 are small. Therefore, it is possible to ensure the rotation angle detection accuracy of each of the first resolver 1 and the second resolver 2.

In this modified example, the mounting seat portion 30 is provided with a connector 70 of the torque sensor. Thus, the size of the torque sensor is made smaller than that in a case where a connector is provided at a portion different from the mounting seat portion 30.

Figure 5A:
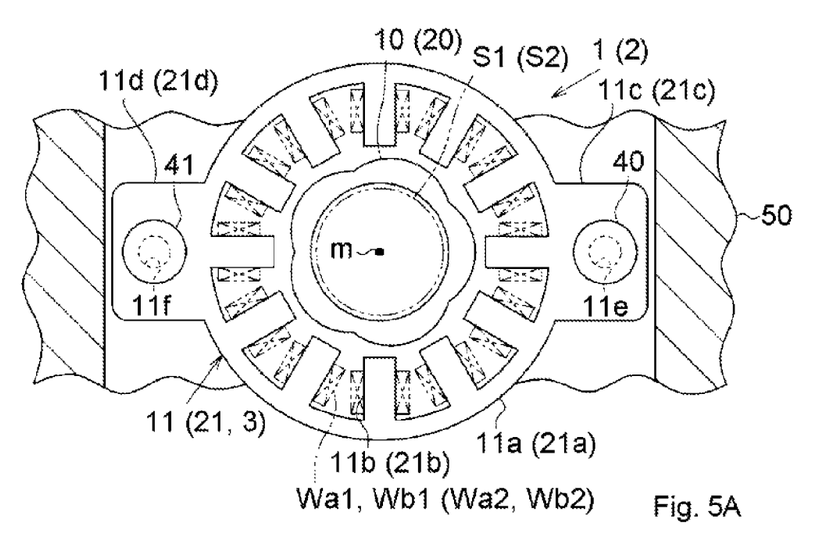
FIG. 5A is a plan view that shows the planar structure of a torque sensor according ing to a second embodiment, in which the stator according to the invention is used.

Subsequently, a torque sensor according to a second embodiment, in which the stator according; to the invention is used, will be described with reference to FIG. 5A, FIG. 5B and FIG. 6. Hereinafter, the differences from the first embodiment will be mainly described.

Figure 5B:
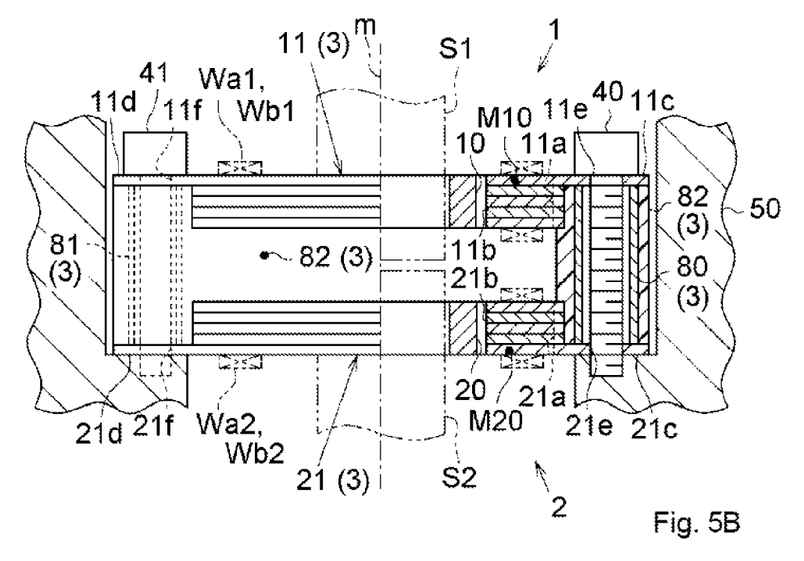
FIG. 5B is a sectional view that shows the half-sectional structure of the torque sensor according to the second embodiment.
Figure 6:
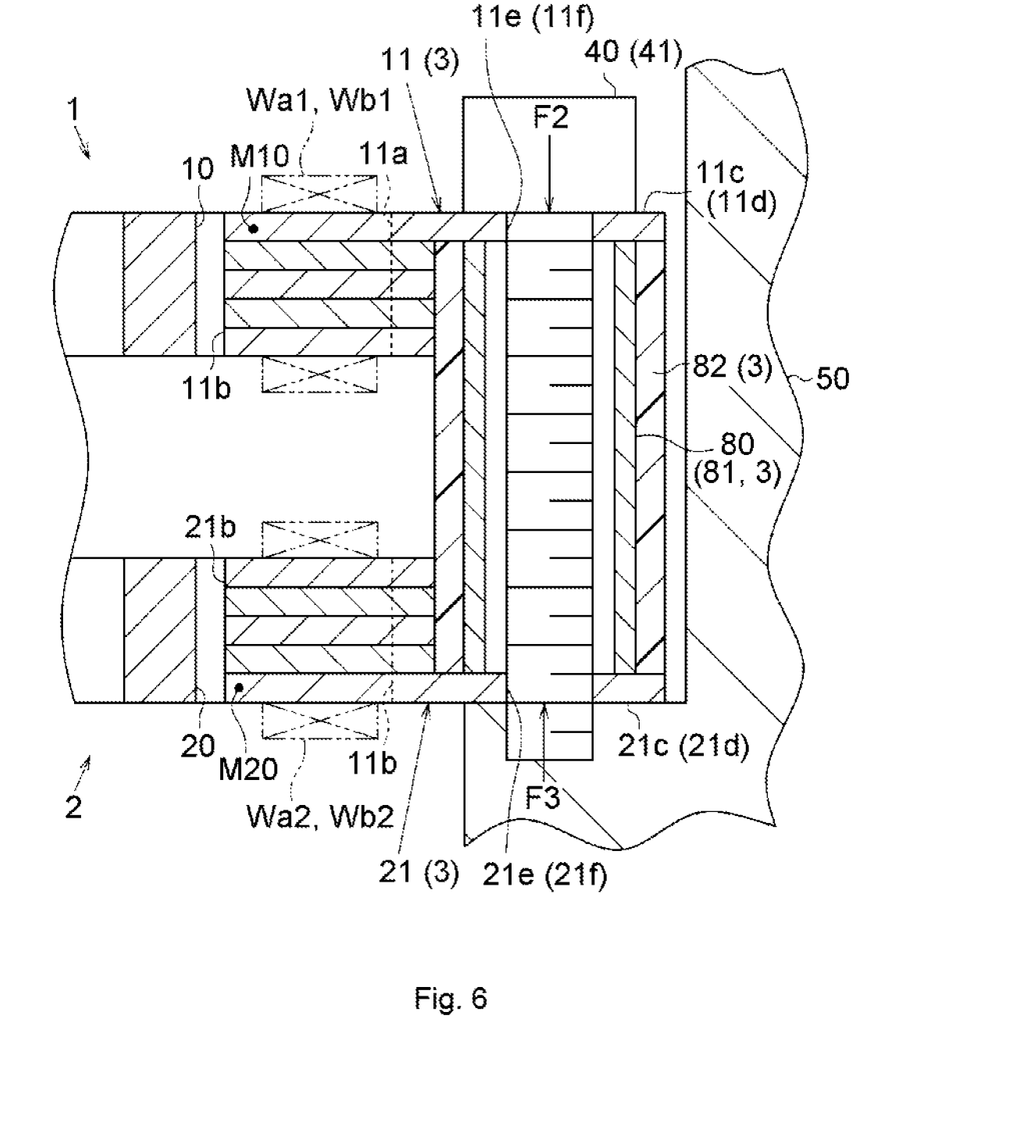
FIG. 6 is a sectional view that shows the enlarged sectional structure of a fixing portion of a mounting seat portion and its surroundings in the torque sensor according to the second embodiment.

As shown in FIG. 5B, in the first resolver 1 according to the present embodiment, a pair of mounting seat portions 11c, 11d is formed on an outer annular portion 11a of an electromagnetic steel sheet M10 that is farthest from the second resolver 2 among a plurality of electromagnetic steel sheets that constitute the stator core 11. As shown in FIG. 5A, the mounting seat portions 11c, 11d are arranged at symmetrical positions with respect to the axis m. As shown in FIG. 5B, an insertion hole 11e through which the bolt 40 is passed is formed in the mounting seat portion 11c, and an insertion hole 11f through which the bolt 41 is passed is formed in the mounting seat portion 11d. The hole diameter of each of the insertion holes 11e, 11f is substantially equal to the outside diameter of a shaft portion of corresponding one of the bolts 40, 41.

As shown in FIG. 5B, the stator core 21 of the second resolver 2 has a structure basically similar to that of the stator core 11 of the first resolver 1. That is, a pair of mounting seat portions 21c, 21d is formed on the outer periphery of an outer annular portion 21a of an electromagnetic steel sheet M20 that is farthest from the first resolver 1 among a plurality of electromagnetic steel sheets that constitute the stator core 21. As shown in FIG. 5A, the mounting seat portions 21c, 21d are also arranged at symmetrical positions with respect to the axis m. As shown in FIG. 5B, an insertion hole 21e through which the bolt 40 is passed is firmed in the mounting seat portion 21c, and an insertion hole 21f through which the bolt 41 is passed is formed in the mounting seat portion 21d. The insertion holes 21e, 21f respectively have the same hole diameters as the insertion holes 11e, 11f of the stator core 11, and are respectively arranged coaxially with the insertion holes 11e, 11f.

As shown in FIG. 5B, a cylindrical bush 80 is interposed between the mounting seat portions 11c, 21c of the stator cores 11, 21 at the positions of the insertion holes 11e, 21e. Similarly, a bush 81 is interposed between the mounting seat portions 11d, 21d of the stator cores 11, 21 at the positions of the insertion holes 11f, 21f. Each of the bushes 80, 81 has an inside diameter that is slightly larger than the hole diameter of corresponding two of the insertion holes 11e, 21e, 11f, 21f.

A fixing member 82 made of resin is insert-molded between the mounting seat portions 11c, 21c, between the mounting seat portions 11d, 21d and between the outer annular portions 11a, 21a of the stator cores 11, 21. Thus, it is possible to assemble the stator cores 11, 21 and the bushes 80, 81 into one component, via the fixing member 82. Therefore, it becomes easy to fit the stator cores 11, 21 and the bushes 80, 81 to the case 50. Furthermore, the bush 80 is fixed by the fixing member 82 so as to be coaxial with the insertion holes 11e, 21e, and the bush 81 is fixed by the fixing member 82 so as to be coaxial with the insertion holes 11f, 21f. Thus, when the bolts 40, 41 are passed through the insertion holes 11e, 21e and the insertion holes 11f, 21f respectively, it is possible to easily pass the bolts 40, 41 through the bushes 80, 81. Thus, fastening work becomes easy. In the present embodiment, the stator cores 11, 21, the bushes 80, 81 and the fixing member 82 constitute the stator 3.

In the stator 3 according to the present embodiment, by screwing the distal end portions of the bolts 40, 41 into the threaded holes of the case 50, the mounting seat portions 11c, 11d of the stator core 11 and the mounting seat portions 21c, 21d of the stator core 21 each are fastened to the case 50. Thus, the entirety of the stator 3 is fixed to the case 50 via the mounting seat portions 11c, 11d, 21c, 21d.

Next, the operation of the stator 3 according to the present embodiment will be described with reference to FIG. 6. As in the first embodiment, when the mounting seat portion is formed separately from the stator cores, the number of components may increase. In terms of this point, as in the stator 3 according to the present embodiment, when the mounting seat portions 11c, 11d and the mounting seat portions 21c, 21d are respectively formed on the outer peripheries of the electromagnetic steel sheets M10, M20 arranged at the respective ends of the stator cores 11, 21, it is possible to avoid an increase in the number of components. Even when such a structure is employed, fastening axial forces F2, F3 of the bolts 40, 41 mainly act on the electromagnetic steel sheets M10, M20 as shown in the drawing. Therefore, it is possible to reduce a stress that occurs in each of the stator cores 11, 21. Thus, it is possible to suppress deterioration of the magnetic characteristic of each of the stator cores 11, 21 due to fastening of the bolts 40, 41.

When the two stator cores 11, 21 are arranged so as to be aligned in the axial direction, passing the common bolt 40 through the insertion holes 11e, 21e of the respective mounting seat portions 11c, 21c is effective. Thus, when the common bolt 40 is fastened to the case 50, it is possible to fix the stator cores 11, 21 to the case 50 at the same time. Therefore, fastening work becomes easy.

When the above-described fastening method is employed, the fastening axial forces F2, F3 in mutually attracting directions as shown in the drawing respectively act on the mounting seat portions 11c, 21c of the stator cores 11, 21. When the mounting seat portions 11c, 21c deform due to these fastening axial forces F2, F3, a stress may occur in each of the stator cores 11, 21 and the magnetic characteristic of each of the stator cores 11, 21 may deteriorate.

In terms of this point, in the present embodiment, even when the fastening axial forces F2 and F3 in mutually attracting directions respectively at on the mounting seat portions 11c, 21c, the mounting seat portions 11e, 21c are supported by the bush 80 interposed therebetween. Therefore, deformation of the mounting seat portions 11c, 21c is suppressed. Similarly, when the bolt 41 is fastened, deformation of the mounting seat portions 11d, 21d is suppressed by the bush 81. Thus, it is possible to further reduce a stress that occurs in each of the stator cores 11, 21. Therefore, it is possible to further adequately suppress deterioration of the magnetic characteristic of each of the stator cores 11, 21.

On the other hand, each stator core is usually formed by stamping electromagnetic steel sheets with the use of a stamping die corresponding to the shape of the stator core. In the stator core 11 according to the present embodiment, the insertion holes 11e, 11f are formed in the outer periphery of one of the electromagnetic steel sheets. Therefore, at the time of stamping the electromagnetic steel sheets, it is possible to also form the insertion holes 11e, 11f together with the outer annular portion 11a and the teeth 11b. Thus, the positional accuracy of the insertion holes 11e, 11f with respect to the outer annular portion 11a and the teeth 11b improves. Therefore, it is possible to relax positional accuracy tolerances of the insertion holes 11e, 11f. Similarly, because the positional accuracy of the insertion holes 21e, 21f of the stator core 21 also improves, it is also possible to relax positional accuracy tolerances of the insertion holes 21e, 21f.

In the present embodiment, because the hole diameter of each of the insertion holes 11e, 11f, 21e, 21f of the stator cores 11, 21 is set smaller than the inside diameter of each of the bushes 80, 81, the inner wall portions of the insertion holes 11e, 11f, 21e, 21f contact the bolts 40, 41. That is, the accuracy of fitting the stator cores 11, 21 to the case 50 depends on the positional accuracy of each of the insertion holes 11e, 11f, 21e, 21f. In terms of this point, in the present embodiment, because it is possible to increase the positional accuracy of each of the insertion holes 11e, 11f, 21e, 21f as described above, the accuracy of fitting the stator cores 11, 21 to the case 50 improves. Thus, it is possible to also improve the fitting accuracy of the torque sensor.

As described above, with the stator of the torque sensor according to the present embodiment, the following advantageous effects are obtained.

(6) The mounting seat portions 11e, 11d and the mounting seat portions 21c, 21d are respectively formed on the outer peripheries of the electromagnetic steel sheets M10, M20 respectively arranged at the axial end portions of the stator cores 11, 21. Thus, it is possible to suppress deterioration of the magnetic characteristic of each of the stator cores 11, 21 due to fastening of the bolts 40, 41. In addition, it is possible to suppress a change in the performance of the stator 3 before and after the fastening. Furthermore, the positional accuracy of each of the insertion holes 11e, 11f, 21e, 21f respectively formed in the mounting seat portions 11c, 11d, 21e, 21d improves.

(7) The bush 80 is interposed between the mounting seat portions 11c, 21c, and the bush 81 is interposed between the mounting seat portions 11d, 21d. Thus, the bushes 80, 81 respectively bear the fastening axial forces F2, F3 that act due to fastening of the bolts 40, 41. Therefore, it is possible to further reduce a stress that occurs in each of the stator cores 11, 21. Therefore, it is possible to further adequately suppress deterioration of the magnetic characteristic of each of the stator cores 11, 21.

(8) The fixing member 82 is insert-molded between the mounting seat portions 11e, 21c and between the mounting seat portions 11d, 21d. The bush 80 is fixed by the fixing member 82 so as to be coaxial with the insertion holes 11e, 21e, and the bush 81 is fixed by the fixing member 82 so as to be coaxial with the insertion holes 11f, 21f. Thus, it is possible to assemble the stator cores 11, 21 and the bushes 80, 81 into one component, via the fixing member 82. Therefore, it becomes easy to fit the stator cores 11, 21 and the bushes 80, 81 to the case 50. In addition, when the bolt 40 is passed through the insertion holes 11e, 21e and the bolt 41 is passed through the insertion holes 11f, 21f, it is possible to easily pass the bolt 40 through the bush 80 and pass the bolt 41 through the bush 81. Therefore, fastening work becomes easy.

(9) The hole diameter of each of the insertion holes 11e, 11f, 21e, 21f of the stator cores 11, 21 is set smaller than the inside diameter of each of the bushes 80, 81. Thus, at the time of fastening the bolts 40, 41, it is possible to fit the stator cores 11, 21 to the case 50 with reference to the insertion holes 11e, 11f, 21e, 21f having a high positional accuracy. Thus, the accuracy of fitting the stator cotes 11, 21 to the 50 improves, and, consequently, it is possible to improve the fitting accuracy of the torque sensor.

Figure 7:
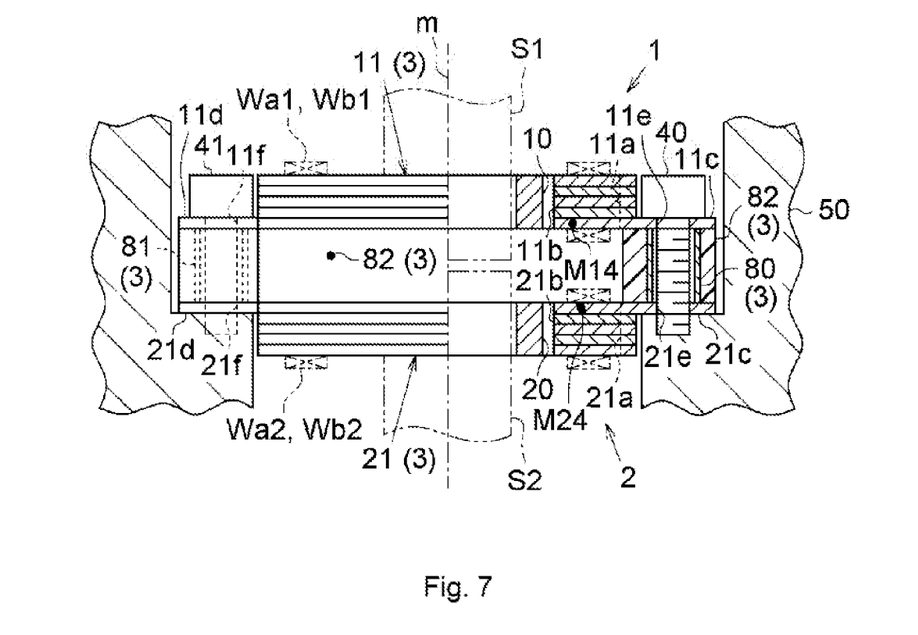
FIG. 7 is a sectional view that shows the half-sectional structure of a first modified example of the torque sensor according to the second embodiment.

Subsequently, a first modified example of the second embodiment will be described with reference to FIG. 7. As shown in FIG. 7, in this modified example, the mounting seat portions 11c, 11d and the mounting seat portions 21c, 21d are respectively formed in electromagnetic steel sheets M14, M24 that are in proximity to and facing the counterpart stator cores among the electromagnetic steel sheets that constitute the stator cores 11, 21. With the above configuration, it is possible to suppress a protruded amount of a head of each of the bolts 40, 41 that protrude in the axial direction of the stator core 11 and to reduce the axial length of the entirety of the torque sensor. In addition, it is possible to reduce the length of each of the bushes 80, 81 respectively interposed between the mounting seat portions 11c, 21c and the mounting seat portions 11d, 21d. Therefore, it is possible to reduce the material cost of the bushes 80, 81.

Subsequently, a second modified example of the second embodiment will be described. As in the second embodiment, when the structure in which each bush is interposed between the mounting seat portions is employed, almost no stress occurs in each of the stator cores. Therefore, it is possible to change the fastening position of each bolt as needed. Thus, for example, a structure shown in FIG. 8A and FIG. 8B may be employed.

Figure 8A:
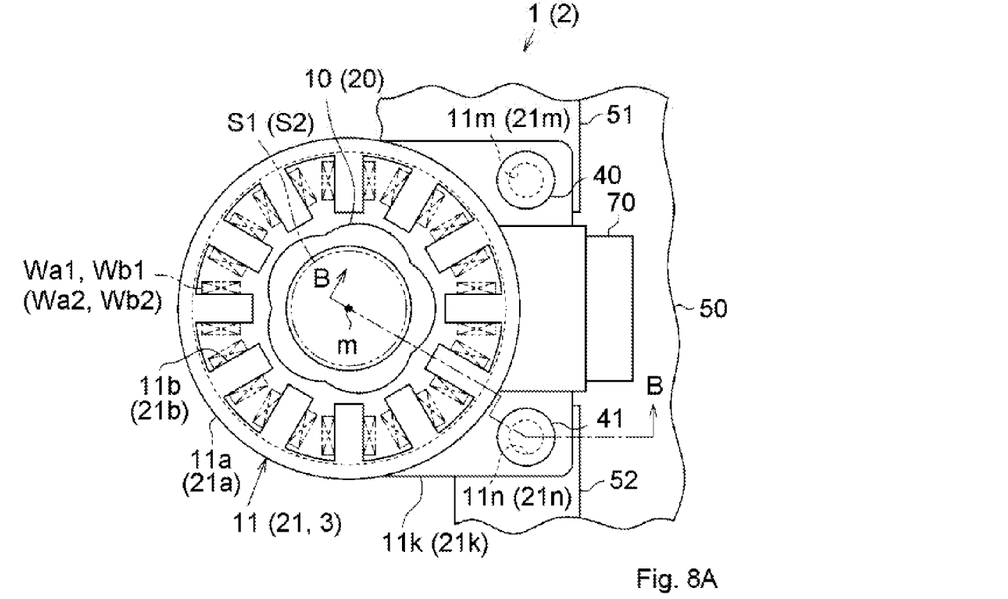
Figure 8B:
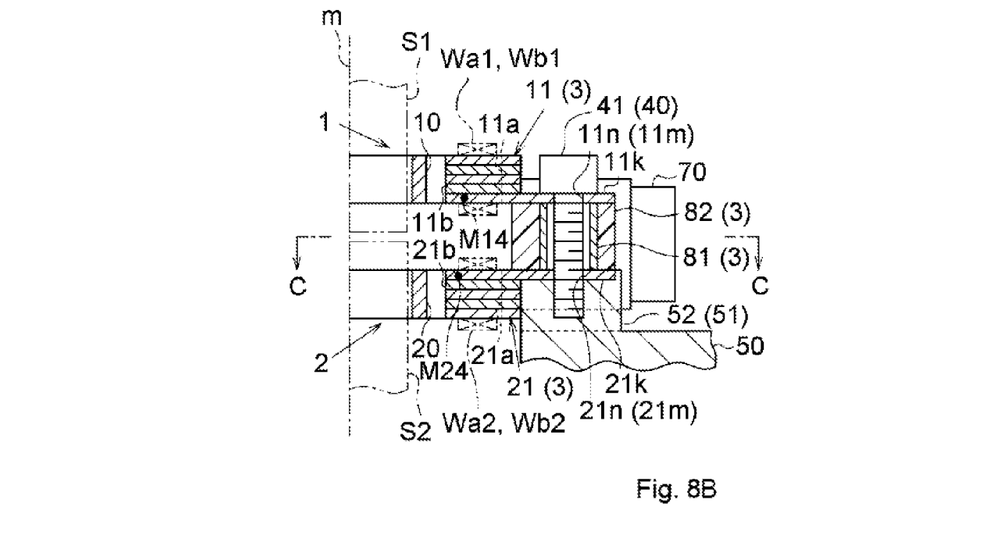
FIG. 8B is a sectional view that shows the sectional structure taken along the line B-B in FIG. 8A.

As shown in FIG. 8A and FIG. 8B, in this modified example, a rectangular mounting seat portion 11k is formed on the outer periphery of the outer annular portion of the electromagnetic steel sheet M14 of the stator core 11. The mounting seat portion 11k has a width substantially equal to the diameter of the stator core 11. Insertion holes 11m, 11n through which the bolts 40, 41 are passed are formed at the corner portions of the outer peripheral portion of the mounting seat portion 11k. A rectangular mounting seat portion 21k is also formed on the outer periphery of the outer annular portion 21a of the electromagnetic steel sheet M24 of the stator core 21, and has a width substantially equal to the diameter of the stator core 21. Insertion holes 21m and 21n through which the bolts 40, 41 are passed are formed in the corner portions of the outer peripheral portion of the mounting seat portion 21k. The bush 81 is interposed between the mounting seat portions 11k, 21k at the positions of the insertion holes 11n, 21n, and a bush (not shown) is interposed between the mounting seat portions 11k, 21k at the positions of the insertion holes 11m, 21m. The fixing member 82 made of resin is insert-molded between the mounting seat portions 11k, 21k and between the outer annular portions 11a, 21a of the stator cores 11, 21. As shown in FIG. 8B, by screwing the distal end portions of the bolts 40, 41 into the threaded holes respectively formed in the bases 51, 52 of the case 50, the stator cores 11, 21 are fastened to the case 50. When the fastening positions of the bolts are biased in this way as well, a biased stress hardly acts on each of the stator cores 11, 21. Thus, variations in the magnetic characteristic of each of the stator cores 11, 21 are small. Therefore, it is possible to ensure the rotation angle detection accuracy of each of the first resolver 1 and the second resolver 2.

In addition, in this modified example, the connector 70 of the torque sensor is formed at the fixing member 82. Thus, it is possible to make the torque sensor smaller than that in the case where a connector is provided at a portion different from the fixing member 82.

Figure 9:
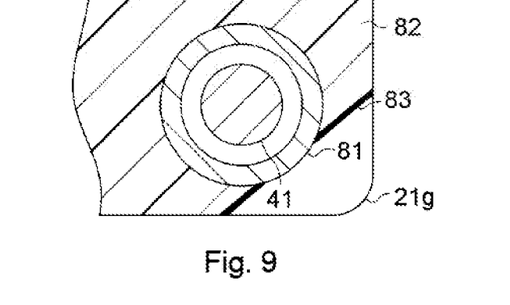
FIG. 9 is a sectional view that shows the sectional structure taken along the line C-C in FIG. 8B as a third modified example of the torque sensor according, to the second embodiment.

Subsequently, a third modified example of the second embodiment will be described with reference to FIG. 9. FIG. 9 shows a sectional structure taken along the line C-C in FIG. 8B. Hereinafter, differences from the second modified example will be mainly described.

As shown in FIG. 9, in this modified example, a cutout 83 is formed at each corner of the fixing member 82 such that the hush 81 does not fall off. Thus, it is possible to reduce the size of the fixing member 82 by the amount of each cutout 83. Therefore, it is possible to reduce the material cost of the fixing member 82.

Subsequently, a fourth modified example of the second embodiment will be described with reference to FIG. 10. A torque sensor according to the present modified example is also a twin-resolver type resolver, and the first resolver and the second resolver are separately formed. The first resolver and the second resolver each have the same structure. Therefore, only the first resolver will be described for the sake of convenience.

Figure 10:
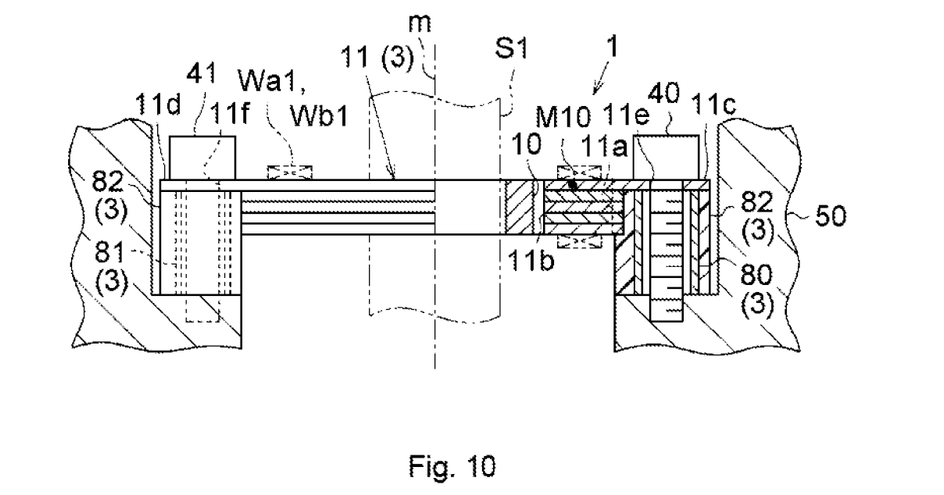
FIG. 10 is a sectional view that shows the sectional structure of a fourth modified example of the torque sensor according to the second embodiment.

As shown in FIG. 10, in the first resolver 1 according to this modified example, the bush 80 is interposed between the mounting seat portion 11c of the stator core 11 and the case 50, and the hush 81 is interposed between the mounting seat portion 11d of the stator core 11 and the case 50. The fixing member 82 is insert-molded with the stator core 11 so as to cover the bushes 80, 81. Thus, the bushes 80, 81 are fixed to the stator core 11. By screwing the distal end portions of the bolts 40, 41 into the threaded holes of the case 50, the stator core 11 is fastened to the case 50. In the case of such a single resolver, when the bush 80 is interposed between the mounting seat portion 11c and the case 50 and the bush 81 is interposed between the mounting seat portion 11d and the case 50, it is possible to reduce a stress that occurs in the stator core 11 due to fastening of the bolts 40, 41. Therefore, it is possible to suppress deterioration of the magnetic characteristic of the stator core 11.

Subsequently, a torque sensor according to a third embodiment, in which the stator according to the invention is used, will be described with reference to FIG. 11. Hereinafter, differences from the second embodiment will be mainly described.

Figure 11:
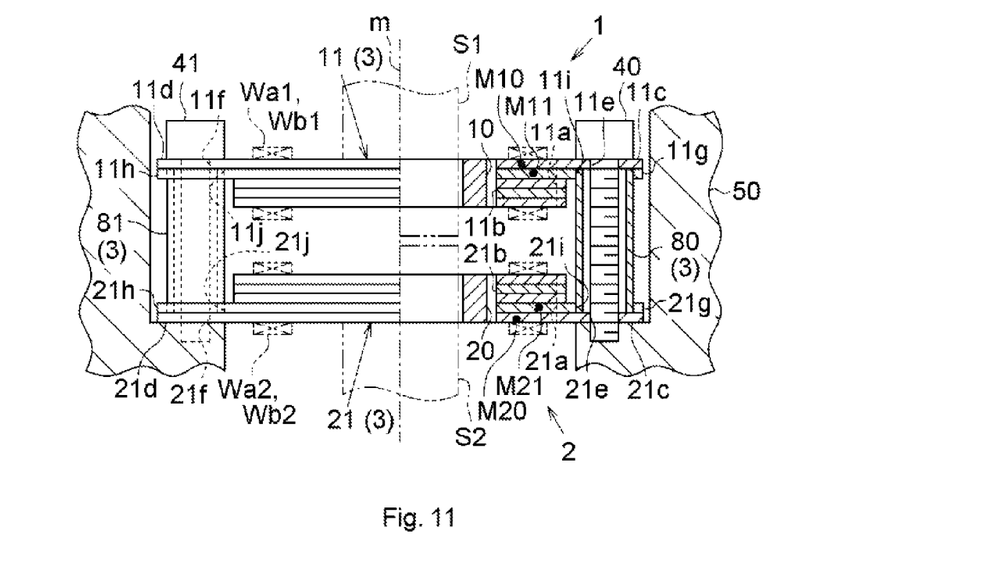
FIG. 11 is a sectional view that shows the sectional structure of a torque sensor according to a third embodiment, in which the stator according to the invention is used.

As shown in FIG. 11, in the present embodiment, positioning portions 11g, 11h are formed on the outer periphery of the outer annular portion 11a of an electromagnetic steel sheet M11 adjacent to the electromagnetic steel sheet M10 arranged at the end of the stator core 11. The positioning portions 11g, 11 h extend so as to respectively overlap with the mounting seat portions 11c, 11d. Fitting holes 11i, 11j are respectively formed in the positioning portions 11g and 11h. The upper end portions of the bushes 80, 81 are respectively fitted to the fitting holes 11i, 11j.

Positioning portions 21g, 21h are also respectively formed on the outer periphery of an electromagnetic steel sheet M21 adjacent to the electromagnetic steel sheet M20 arranged at the end of the stator core 21. The positioning portions 21g, 21h extend so as to respectively overlap with the mounting seat portions 21c, 21d. Fitting holes 21i, 21j are respectively formed in the positioning portions 21g, 21 h. The lower end portions of the bushes 80, 81 are respectively fitted in the fitting holes 21, 21j.

With the above configuration, the bush 80 is fixedly positioned so as to be coaxial with the insertion holes 11e, 21e by the positioning portions 11g, 21g of the electromagnetic steel sheets M11, M21. In addition, the bush 81 is fixedly positioned so as to be coaxial with the insertion holes 11f, 21f by the positioning portions 11h, 21h. Thus, it is possible to assemble the stator cores 11, 21 and the bushes 80, 81 into one component. Therefore, mounting work becomes easy. At the time of respectively passing the bolts 40, 41 through the insertion holes 11e, 21e and the insertion holes 11f, 21f, it is possible to easily respectively pass the bolts 40, 41 through the bushes 80, 81. Therefore, fastening work becomes easy. In addition, it is possible to reduce the number of components because the fixing member 82 in the second embodiment is no longer necessary.

As described above, with the stator of the torque sensor according to the present embodiment, advantageous effects equivalent to or similar to (6), (7), (9) of the second embodiment are obtained, and the following advantageous effect instead of the advantageous effect of (8) is obtained.

(10) The positioning portions 11g, 11h and the positioning portions 21g, 21 are respectively formed on the outer peripheries of the electromagnetic steel sheets M11, M21 of the stator cores 11, 21, and the positioning portions 11g, 21g and the positioning portions 11h, 21h respectively fixedly position the bushes 80, 81 such that the bushes 80, 81 are coaxial with the insertion holes 11e, 21e and the insertion holes 11f, 21f. Thus, it is possible to easily respectively pass the bolts 40, 41 through the bushes 80, 81. Therefore, fastening work is easy. In addition, it is possible to reduce the number of components because the fixing member 82 is no longer necessary.

Figure 12:
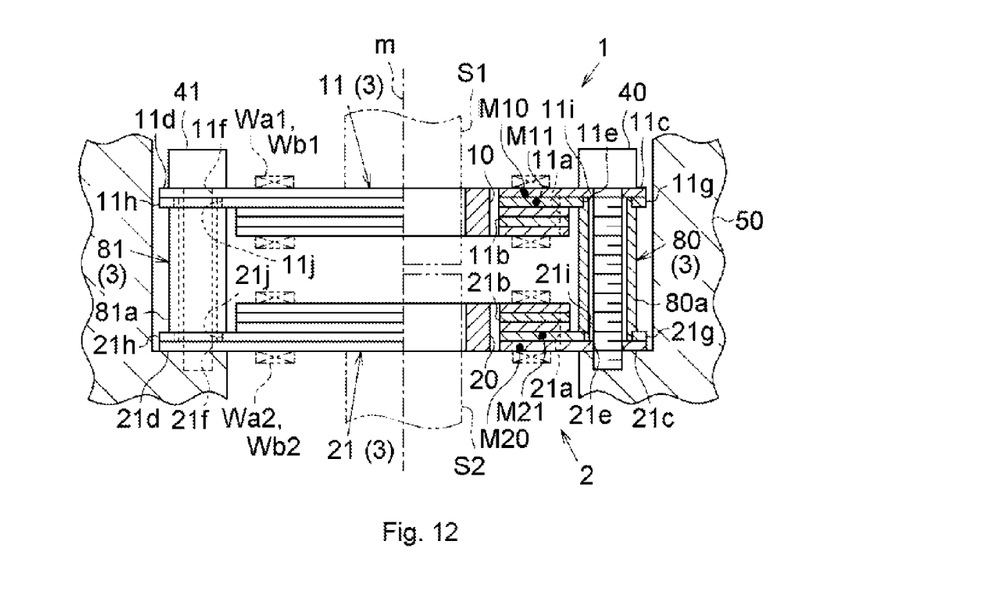
FIG. 12 is a sectional view that shows the sectional structure of a first modified example of the torque sensor according to the third embodiment.

Subsequently, a first modified example of the third embodiment will be described with reference to FIG. 12. As shown in FIG. 12, in this modified example, a large-diameter portion 80a is formed at a portion of the bush 80, which is not fitted in the fitting hole 11i or 21i, and a large-diameter portion 81a is formed at a portion of the bush 81, which is not fitted in the fitting hole 11j or 21j. Both end faces of the large-diameter portion 80a respectively contact the positioning portions 11g, 21g, and both end faces of the large-diameter portion 81a respectively contact the positioning portions 11h, 21h. With the above-described configuration, not only the mounting seat portion 11c is directly supported by the upper end face of the bush 80 but also the mounting seat portion 11c is indirectly supported by the large-diameter portion 80a via, the positioning portion 11g. Therefore, it is possible to further appropriately suppress deformation of the mounting seat portion 11c. Similarly it is also possible to suppress deformation of each of the mounting seat portions 11d, 21c, 21d. Thus, it is possible to further reduce a stress that occurs in each of the stator cores 11, 21. As a result, it is possible to further appropriately suppress deterioration of the magnetic characteristic of each of the stator cores 11, 21.

Figure 13:
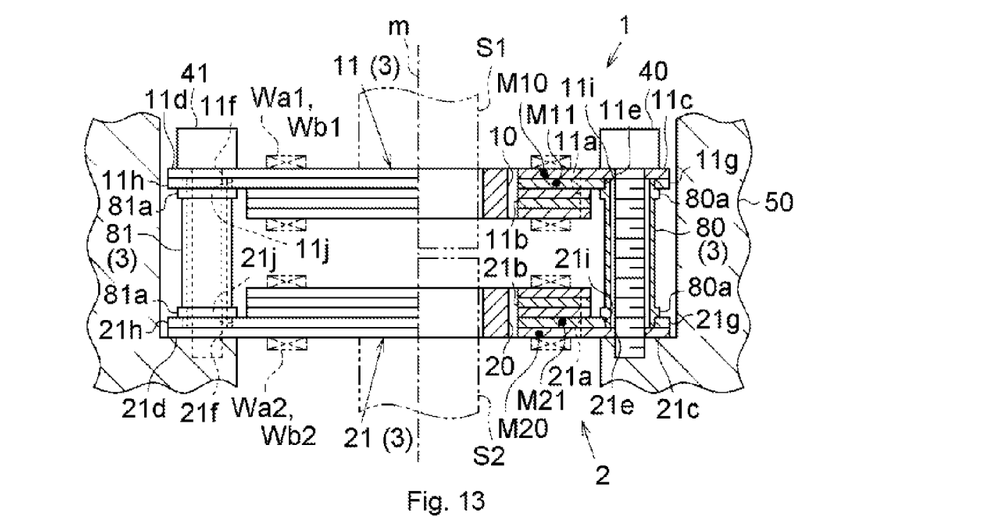
FIG. 13 is a sectional view that shows the sectional structure of another example of the first modified example of the torque sensor according to the third embodiment.

In this first modified example, as shown in FIG. 13, the thickness of the center portion of each of the large-diameter portions 80a, 81a may be reduced. Thus, it is possible to reduce the weight of each of the bushes 80, 81.

Figure 14:
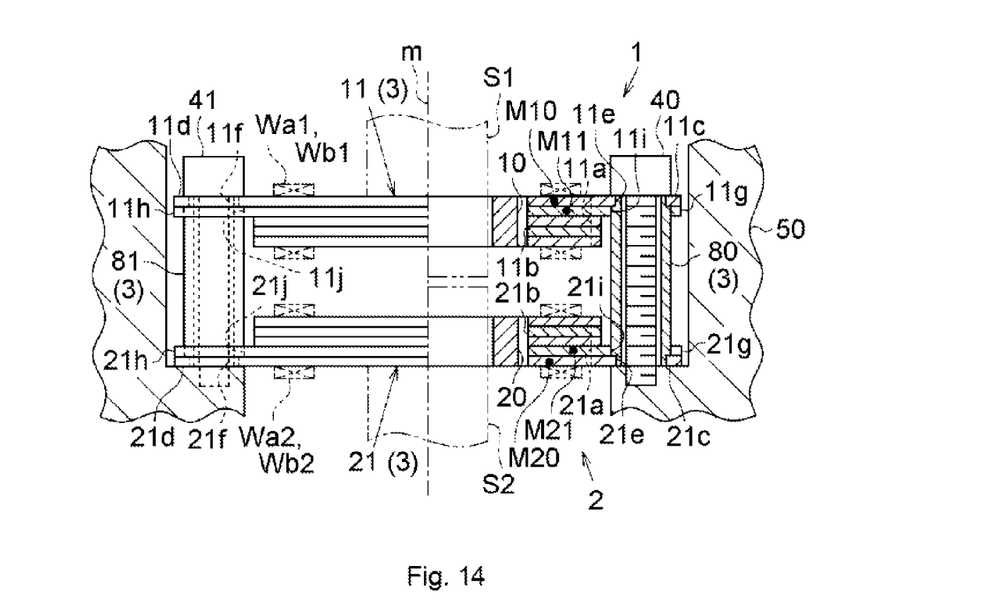
FIG. 14 is a sectional view that shows the sectional structure of a second modified example of the torque sensor according to the third embodiment.

Subsequently, a second modified example of the third embodiment will be described with reference to FIG. 14. Hereinafter, differences from the first modified example will be mainly described. As shown in FIG. 14, in this modified example, the hole diameter of each of the insertion holes 11e, 11f, 21e, 21f of the mounting seat portions 11c, 11d, 21c, 21d is set larger than the outside diameter of the shaft portion of each of the bolts 40, 41. Protrusions are formed at respective end portions of the bush 80. The protrusions are respectively inserted in a clearance between the insertion hole 11e and the shaft portion of the bolt 40 and a clearance between the insertion hole 21e and the shaft portion of the bolt 40. In addition, protrusions are formed at respective end portions of the bush 81, and are respectively inserted in a clearance between the insertion hole 1 if and the shaft portion of the bolt 41 and a clearance between the insertion hole 2 if and the shaft portion of the bolt 41. With the above configuration as well, it is possible to fix the bush 80 such that the bush 80 is coaxial with the insertion holes 11e, 21e and to fix the bush 81 such that the bush 81 is coaxial with the insertion holes 11f, 21f. Therefore, it is possible to obtain advantageous effects similar to the advantageous effects of the third embodiment.

Note that the above-described embodiments may be modified into the following embodiments as needed. In the first embodiment, the mounting seat portion 30 is formed by laminating a plurality of electromagnetic steel sheets. Alternatively, the mounting seat portion 30 may be formed of only a single electromagnetic steel sheet.

In the first embodiment, the material of the mounting seat portion 30 is not limited to a laminated structure of electromagnetic steel sheets. Alternatively, for example, a resin, iron, a nonferrous metal, or the like, may be employed.

In the first embodiment, the mounting seat portion 30 is fitted to the stator cores 11, 21 by swaging. Alternatively for example, welding using a YAG laser may be utilized.

In the second embodiment, the material of the fixing member 82 is not limited to a resin. For example, aluminum, or the like, may be employed.

In the second embodiment, the bushes 80, 81 are fixed to the stator cores 11, 21 by insert molding. Alternatively a structure in which the bushes 80, 81 are not fixed but the bush 80 is inserted between the mounting seat portions 11c, 21c and the bush 81 is inserted between the mounting seat portions 11d, 21d may be employed.

In the second embodiment, the member that is interposed between the mounting seat portions 11c, 21c and the member that is interposed between the mounting seat portions 11d, 21d are not limited to the bushes 80, 81. Appropriate members may be employed. In short, intervening members just need to be respectively interposed between the mounting seat portions 11c, 21c and between the mounting seat portions 11d, 21d so as to receive fastening axial forces that respectively act on the mounting seat portions 11c, 21c and the mounting seat portions 11d, 21d. This also applies to the third embodiment.

In the second and third embodiments, the hole diameter of each of the insertion holes 11e, 11f, 21e, 21f of the stator cores 11, 21 is set smaller than the inside diameter of each of the bushes 80, 81. Alternatively the hole diameter of each of the insertion holes 11e, 11f, 21e, 21f of the stator cores 11, 21 may be set substantially the same length as the inside diameter of each of the bushes 80, 81. Further alternatively, the hole diameter of each of the insertion holes 11e, 11f, 21e, 21f of the stator cores 11, 21 may be set larger than the inside diameter of each of the bushes 80, 81.

In the third embodiment, the positioning portions 11g, 11h are provided only at the electromagnetic steel sheet M11 that constitutes the stator core 11. However, the invention is not limited to this. The positioning portions 11g, 11h may be provided at any of the electromagnetic steel sheets that constitute the stator core 11, and may be provided at a plurality of the electromagnetic steel sheets. The positioning portions 21g, 21h may also be provided at any of the electromagnetic steel sheets that constitute the stator core 21, and may be provided at a plurality of the electromagnetic steel sheets.

In the third embodiment, as in the second modified example of the second embodiment illustrated in FIG. 5A and FIG. 8B, the positions of the mounting seat portions 11c, 11d, 21c, 21d may be changed as needed.

In the third embodiment, as in the first modified example of the second embodiment illustrated in FIG. 7, the mounting seat portions may be respectively formed in electromagnetic steel sheets that are in proximity to and facing the counterpart stator cores among the electromagnetic steel sheets that constitute the stator cores 11, 21.

The shape of each mounting seat portion according to the above-described embodiments may be changed as needed.

The number of the insertion holes formed in each mounting seat portion according to the above-described embodiments is not limited to two, and may be changed as needed to, for example, one.

The multiplication factor of angle of each of the first resolver 1 and the second resolver 2 may be changed as needed.

In the above-described embodiments, the bolts are used as fastening members. Alternatively, for example, rivets or the like, may be used.

What is claimed is:

1. A stator of a torque sensor, the stator comprising:
two cylindrical stator cores each having axial end portions, each of the two cylindrical stator cores formed of a laminated structure of electromagnetic steel sheets and having a coil wound around each, the two cylindrical stator cores arranged to be aligned in an axial direction;
a mounting seat portion fixedly fitted to the axial end portions of the two cylindrical stator cores so as to be held between the two cylindrical stator cores, wherein the mounting seat portion is a separate structure from the two cylindrical stator cores, the mounting seat portion having a same outside diameter as the outside diameters of the two cylindrical stator cores; and
an insertion hole in the mounting seat portion, the insertion hole configured to receive therethrough a fastening member.

2. The stator according to claim 1, further comprising another mounting seat portion, wherein: the mounting seat portions are provided at a respective one of the two cylindrical stator cores, and further comprising:
a common fastening member extending through insertion holes respectively formed in the mounting seat portions of the two cylindrical stator cores; and
an intervening member interposed between the mounting seat portions of the two cylindrical stator cores.

3. The stator according to claim 2, wherein:
the intervening member is a cylindrical member through which the common fastening member is inserted; and
a positioning portion that positions the intervening member such that the intervening member is coaxial with the insertion hole and formed at the electromagnetic steel sheets that form each of the two cylindrical stator cores.

4. The stator according to claim 2, wherein the two cylindrical stator cores, the mounting seat portion and the intervening member are fixedly fitted together by a fixing member.

5. The stator according to claim 4, further comprising a connector at the fixing member.

6. The stator according to claim 1, further comprising an intervening member that is interposed between a base member, defining a case, and the mounting seat portion, when the mounting seat portion is fastened to the base member by the fastening member.

7. The stator according to claim 1, further comprising a connector at the mounting seat portion.

8. A stator of a torque sensor, the stator comprising:
two cylindrical stator cores each having axial end portions, each of the two cylindrical stator cores formed of a laminated structure of electromagnetic steel sheets and having a single coil wound around each, the two cylindrical stator cores arranged to be aligned in an axial direction;
a mounting seat portion fixedly fitted to the axial end portions of the two cylindrical stator cores so as to be held between the two cylindrical stator cores, wherein the mounting seat portion is a separate structure from the two cylindrical stator cores, the mounting seat portion having a same outside diameter as the outside diameters of the two cylindrical stator core; and
an insertion hole in the mounting seat portion, the insertion hole configured to receive therethrough a fastening member.

9. The stator according to claim 1, wherein the mounting seat portion comprises at least one fixing portion protruding outwardly from an outer periphery of the mounting seat portion, the insertion hole formed in the at least one fixing portion.

10. A stator of a torque sensor, the stator comprising:
two cylindrical stator cores each having axial end portions, each of the two cylindrical stator cores formed of a laminated structure of electromagnetic steel sheets and having a coil wound around each, the two cylindrical stator cores arranged to be aligned in an axial direction;
a mounting seat portion fixedly fitted to the axial end portions of the two cylindrical stator cores so as to be held between the two cylindrical stator cores; and
an insertion hole in the mounting seat portion, the insertion hole configured to receive therethrough a fastening member, wherein the mounting seat portion comprises at least one fixing portion protruding outwardly from an outer periphery of the mounting seat portion, the insertion hole formed in the at least one fixing portion and the at least one fixing portion is arranged in an offset position from an outer periphery of the two cylindrical stator cores in an axial direction.

11. A stator of a torque sensor, the stator comprising:
two cylindrical stator cores each having axial end portions, each of the two cylindrical stator cores formed of a laminated structure of electromagnetic steel sheets and having a single coil wound around each, the two cylindrical stator cores arranged to be aligned in an axial direction;
a mounting seat portion fixedly fitted to the axial end portions of the two cylindrical stator cores so as to be held between the two cylindrical stator cores; and
an insertion hole in the mounting seat portion, the insertion hole configured to receive therethrough a fastening member, wherein the mounting seat portion comprises at least one fixing portion protruding outwardly from an outer periphery of the mounting seat portion, the insertion hole formed in the at least one fixing portion and the at least one fixing portion is arranged in an offset position from an outer periphery of the two cylindrical stator cores in an axial direction.

* * * * *